US005507176A

United States Patent [19]

Kammeraad et al.

[11] Patent Number: 5,507,176

[45] Date of Patent: Apr. 16, 1996

[54] EVAPORATIVE EMISSIONS TEST APPARATUS AND METHOD

[75] Inventors: David A. Kammeraad, Holland; Peter R. Chirco, Sterling Heights, both of Mich.

[73] Assignee: K-Line Industries, Inc., Holland, Mich.

[21] Appl. No.: 218,350

[22] Filed: Mar. 28, 1994

[51] Int. Cl.[6] .......... G01M 3/32

[52] U.S. Cl. .......... 73/49.2; 73/49.7

[58] Field of Search .......... 73/49.2, 49.7, 73/40; 123/518, 519, 520

[56] References Cited

U.S. PATENT DOCUMENTS

| | | | |
|---|---|---|---|
| 3,014,361 | 12/1961 | Black | 73/40 |
| 3,583,210 | 6/1971 | Orr | 73/49.2 |
| 3,683,878 | 8/1972 | Rogers | 123/518 |
| 4,235,100 | 11/1980 | Branchini | 73/49.7 |
| 4,497,290 | 2/1985 | Harris . | |
| 4,641,623 | 2/1987 | Hamburg . | |
| 4,715,214 | 12/1987 | Tveter et al. . | |
| 4,794,790 | 1/1989 | Margarit-Metaxa et al. . | |
| 4,867,126 | 9/1989 | Yonekawa et al. . | |
| 4,942,758 | 7/1990 | Cofield | 73/49.2 |
| 4,949,695 | 8/1990 | Uranishi et al. . | |
| 4,953,514 | 9/1990 | Beicht et al. . | |
| 4,962,744 | 10/1990 | Uranishi et al. . | |

(List continued on next page.)

FOREIGN PATENT DOCUMENTS

| | | | |
|---|---|---|---|
| 275441A1 | 1/1990 | German Dem. Rep. | 73/49.2 |

OTHER PUBLICATIONS

Exhibit E is a publication entitled "OBD–II Evaporative System Monitor", published by B. Schwager of Ford Motor Company, dated Sep. 29, 1993, which discloses a method of testing a fuel tank including pressurizing the fuel tank system to 10 inches water with nitrogen, which is a non––combustible gas.

Exhibit A discloses an "all manual" fuel tank assembly leak tester made by or for K–Line Industries, the assignee of the present patent application, which has been used by Ford Motor Company for more than one year to pressure test fuel tank assemblies for fuel leaks. The leak tester includes two styles of special filler caps configures to interface a fuel tank filler neck and sealingly cover same, a pressure regulator, a pressure gage, hoses and connectors for connecting the hoses, and aluminum plugs to seal off all fuel vapor hoses and fuel lines.

Exhibit B discloses a photograph of the fuel tank assembly leak tester disclosed in Exhibit A.

Exhibit C discloses another "all manual" fuel tank assembly leak tester made by or for K–Line Industries, the assignee of the present patent application, which tester was manufactured for Volkswagen Company over one year ago to pressure test fuel tank assemblies for fuel leaks. The leak tester components are listed on the disclosure.

Exhibit D discloses a photograph of the fuel tank assembly leak tester disclosed in Exhibit C.

*Primary Examiner*—Hezron E. Williams
*Assistant Examiner*—Daniel S. Lankin
*Attorney, Agent, or Firm*—Price, Heneveld, Cooper, DeWitt & Litton

[57] ABSTRACT

An evaporative emissions test apparatus is provided including a tester adapted to pressure test a vehicle fuel holding system for vapor emitting leaks. The test apparatus includes an adapter configured to sealingly engage the access port for filling the fuel tank, the adapter being further configured to sealingly receive the vehicle fuel cap so that the vehicle fuel holding system including the fuel cap can be tested as a unit. The tester includes a connector for connecting to the adapter, and further includes a second connector for connecting to a pressure source for pressurizing the fuel holding system and fuel vapor control system to a predetermined pressure. The tester also includes a sensor for sensing the pressure over time, a timer for indicating the passage of a predetermined amount of time, and a display generator and display for indicating if the pressure in the atmosphere is acceptable after passage of the predetermined amount of time.

14 Claims, 5 Drawing Sheets

U.S. PATENT DOCUMENTS 5,022,364 6/1991 Phillips .
5,042,290 8/1991 Geisinger .
5,065,350 11/1991 Fedder .
5,078,006 1/1992 Maresca, Jr. et al. .
5,080,078 1/1992 Hamburg .
5,081,865 1/1992 Zaim .
5,085,194 2/1992 Kuroda et al. .
5,085,197 2/1992 Mader et al. .
5,095,880 3/1992 Ricks .
5,105,653 4/1992 Konter .................................... 73/49.2
5,105,789 4/1992 Aramaki et al. .
5,143,035 9/1992 Kayanuma .
5,146,902 9/1992 Cook et al. ............................ 73/40 X
5,150,689 9/1992 Yano et al. .
5,158,054 10/1992 Otsuka .
5,186,153 2/1993 Steinbrenner et al. .
5,191,870 3/1993 Cook .
5,193,511 3/1993 Fujino .................................... 123/520
5,193,512 3/1993 Steinbrenner et al. .
5,195,498 3/1993 Siebler et al. .
5,197,870 3/1993 Blumenstock et al. .
5,205,263 4/1993 Blumenstock et al. .
5,220,896 6/1993 Blumenstock et al. .
5,239,858 8/1993 Rogers et al. ...................... 123/518 X
5,245,973 9/1993 Otsuka et al. .
5,259,353 11/1993 Nakai et al. .
5,261,379 11/1993 Lipinski et al. .
5,265,577 11/1993 Denz et al. .
5,267,547 12/1993 Chikamatsu et al. .
5,269,277 12/1993 Kuroda et al. .
5,273,020 12/1993 Hayami .
5,275,144 1/1994 Gross .
5,295,472 3/1994 Otsuka .
5,297,527 3/1994 Suzuki et al. .
5,297,529 3/1994 Cook et al. .
5,299,545 4/1994 Kuroda et al. .
5,315,980 5/1994 Otsuka et al. .
5,317,909 6/1994 Yamada et al. .
5,327,873 7/1994 Chuchi et al. .
5,333,589 8/1994 Otsuka .
5,333,590 8/1994 Thomson .
5,349,935 9/1994 Mezger et al. .......................... 123/520
5,369,984 12/1994 Rogers et al. ........................... 73/49.2
5,425,266 6/1995 Fournier .................................. 73/49.7

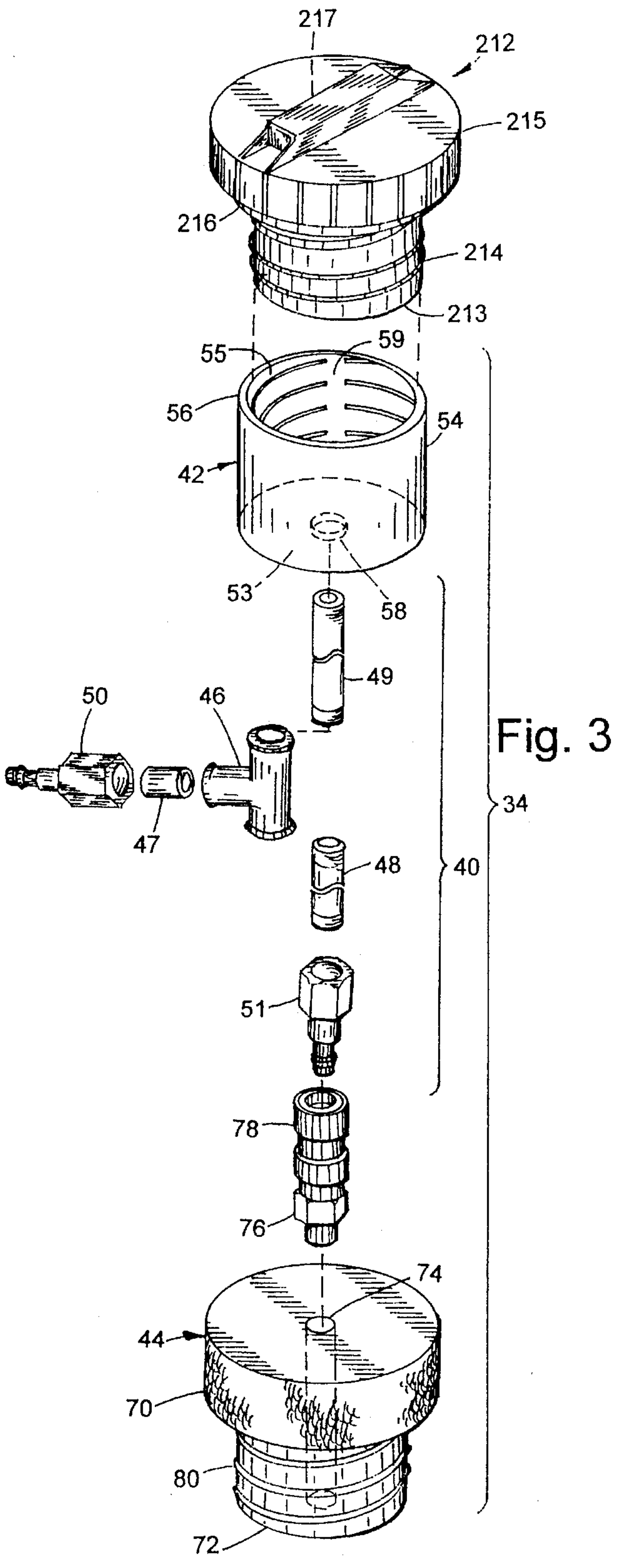
Fig. 3
Fig. 5
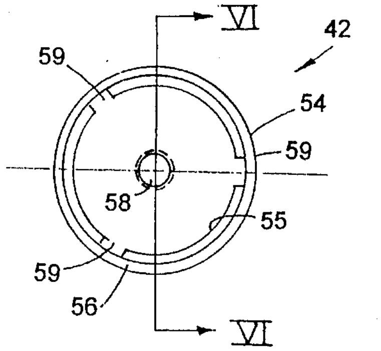
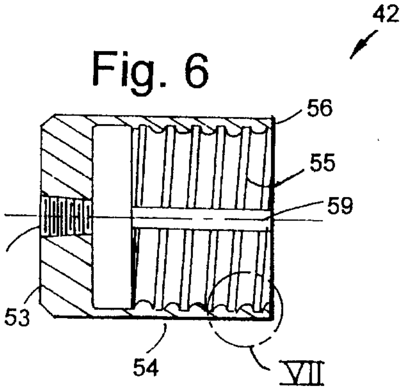
Fig. 6
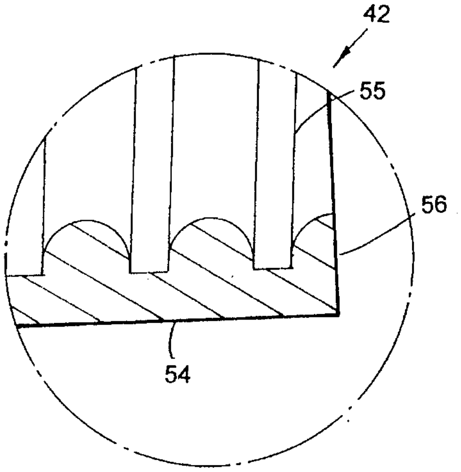
Fig. 7

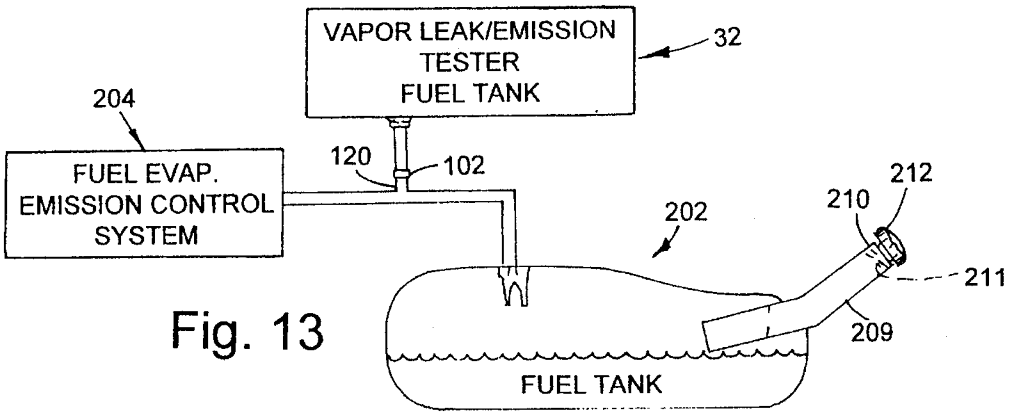
Fig. 13
Fig. 14
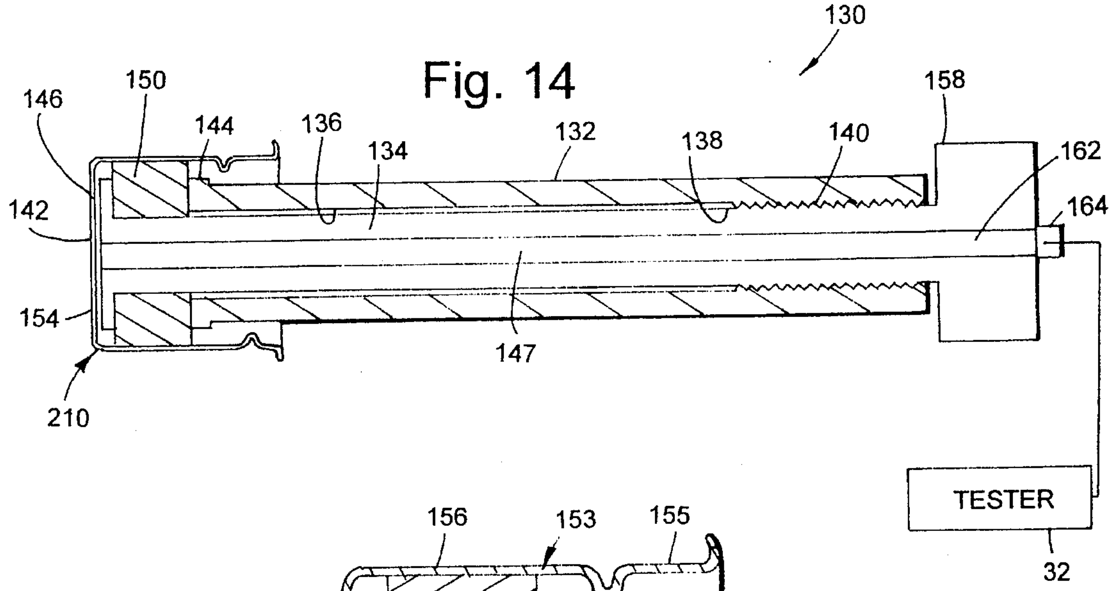
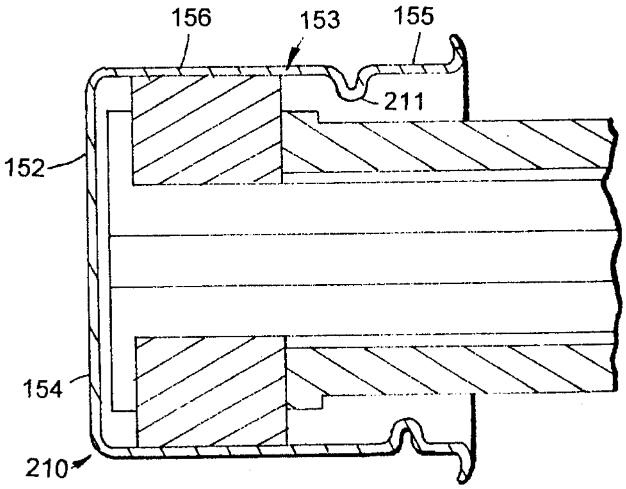
Fig. 15

EVAPORATIVE EMISSIONS TEST APPARATUS AND METHOD

BACKGROUND OF THE INVENTION

The present invention concerns emissions test apparatus, and more particularly concerns an apparatus adapted to pressure test a vehicle fuel holding system including related components for vapor emitting leaks leading to hydrocarbon emissions in the form of evaporated fuel.

Fuel tank assemblies of vehicles in service periodically experience warming, causing the atmosphere in the vehicle fuel holding system to expand. If left uncontrolled, the expanding atmosphere discharges a considerable amount of environmentally harmful hydrocarbon vapors (i.e. gasoline or fuel vapors) into the environment. In an effort to control the discharge of these hydrocarbon vapors, modern vehicles now include fuel caps that sealingly close a fill tube access port to the vehicle fuel tank assembly. Further, the modern vehicles have an evaporative emissions control system which feeds vapors from the fuel tank assembly to the vehicle engine for burning or which otherwise contains the vapors or treats the vapors to reduce their harmful qualities before the vapors are released to the atmosphere.

These systems are generally effective; however, it is desirable to test the integrity of the fuel tank assembly and evaporative emissions control system to assure that there are not any leaks that would allow vapors to bypass the system and be discharged into the environment. Further, government regulations may soon require testing of vehicles that have been in service for a period of time, since such undesirable leaks can develop or worsen during the service life of a vehicle. Unfortunately, the leaks, if present, typically occur at component joints under the vehicle where they are most difficult to find or see, especially if the vehicle has been in service and has a dirty underbody. Still further, the leaks most commonly occur above the fuel level such as on the top side of the fuel tank where the evaporative emissions control system or fuel delivery system attaches to the tank, which top side is hidden from view and difficult or impossible to inspect even on a vehicle hoist.

In response to the above, at least one domestic automotive company has proposed an "all manual" evaporative emissions test method for vehicles which would include providing a special test port attached to the existing evaporative emissions control system or, alternatively, include providing a special test port in a specially adapted "replacement" fuel cap used only during testing. An "all manual" emissions tester would be connected to the special test port, and a pressure source such as an air compressor would be connected to the tester to pressurize the atmosphere of the vehicle fuel tank assembly and the evaporative emissions control system. The "all manual" proposed emissions tester would further include a pressure regulator to control the pressurization of the atmosphere, a shutoff valve to prevent back-flow of the pressurized atmosphere, a pressure gauge for sensing the pressure of the atmosphere over time, and a flexible hose with a connector for connecting to the special test port. The "all manual" proposed test would be controlled manually, with an operator controlling the initial pressurization and stabilization of the atmosphere, and then manually determining the change in pressure over a predetermined time period.

However, the "all manual" proposed tester and test method would not be entirely satisfactory since the manual control over the test and tester could potentially lead to inaccurate and misleading results. This is because manually operated tests depend to a large degree on the precision, accuracy and attention of the operator running the test. Further, particularly in vehicles that are borderline in regard to passing or failing the test, the operator may be biased to misread the tester so that the operator receives additional work (even though the repair is not required) or,: alternatively, so that the operator does not need to do any work (even though the repair should be done), depending upon the preference of the operator. Still further, it is undesirable to require special test ports on the vehicle since this adds to the cost of the vehicle without giving any visible benefit to the consumer. Additionally, it is desirable to test the vehicle fuel holding system as a complete unit rather than individual components one at a time, and thus it is undesirable to remove the existing fuel cap from the vehicle during testing.

Prior art also includes at least two types of other "all manual" testers for testing for fuel leaks in fuel tank assemblies, as disclosed in the disclosure statements submitted with this application. However, these two types of testers are manually operated, and thus depend on the precision, accuracy, and attention of the operator, which results in the problems discussed above. Also, these two testers are for pressure-testing a fuel tank assembly, and not for testing an entire fuel system including an evaporative emissions control system connected to the fuel tank assembly.

Thus, a test apparatus which is accurate and which operates substantially independent of an operator during the actual test sequence is desired. Further, a test apparatus is desired which minimizes the overall cost of any test apparatus and method developed including minimizing any special parts required to be permanently or temporarily assembled to the vehicle.

SUMMARY OF THE INVENTION

In one aspect, the invention includes an evaporative emissions test apparatus for testing for vapor emitting leaks in a vehicle fuel holding system, the vehicle fuel holding system including a fuel tank assembly including a fill tube defining an access port, a fuel cap shaped configured to sealingly cover the access port, and a fuel evaporate emissions control system operably connected to the fuel tank assembly. The test apparatus includes a means for pressurizing the atmosphere in the fuel holding system, and further includes an automatic indicator including a timer for indicating passage of a predetermined period of time, a pressure sensor, means for communicating the pressure of the atmosphere in the vehicle fuel holding system to the pressure sensor, a signal generator operably connected to the timer for generating a signal to indicate if the pressure in tile atmosphere is unacceptably low after passage of the predetermined period of time, and a display for displaying the signal.

In another aspect, the invention includes an adapter which provides a novel means for connecting a test apparatus to the fuel holding system. The adapter includes a body, and first and second end members connected to the body. The first end member is configured to sealingly engage and cover an access port to a fuel holding system in the same manner as a fuel cap engages tile access port. The second end member is configured to sealingly receivingly engage tile fuel cap in the same manner as the access port receivingly engages the fuel cap. The body defines a passageway placing the fuel cap and the fuel holding system in fluid communication when engaged with the first and second end members, respectively. This permits the fuel holding system including the fuel cap to be tested simultaneously as a unit in one test. Further, the fuel holding system need not include a special test port nor other special parts.

These and other features, advantages and objects of the present invention will be further understood and appreciated by those skilled in the art by reference to the following specification, claims and appended drawings.

BRIEF DESCRIPTION OF THE DRAWINGS

FIG. 3 is an exploded perspective view of the adapter shown in FIG. 2 including the fuel cap;

FIG. 5 is an end view of the first end member of the adapter shown in FIG. 3;

FIG. 6 is a cross-sectional view taken along the plane VI—VI in FIG. 5;

FIG. 7 is an enlarged view of the circled area VII in FIG. 6;

FIG. 13 is an alternate embodiment of the present invention showing the tester connected to the evaporative emissions system portion of the vehicle fuel holding system;

FIG. 14 is another alternate embodiment of an adapter for sealingly engaging the access port defined by the fuel fill tube; and FIG. 15 is an enlarged view of an end of the adapter shown in FIG. 14.

DETAILED DESCRIPTION OF THE PREFERRED EMBODIMENT

Figure 1:
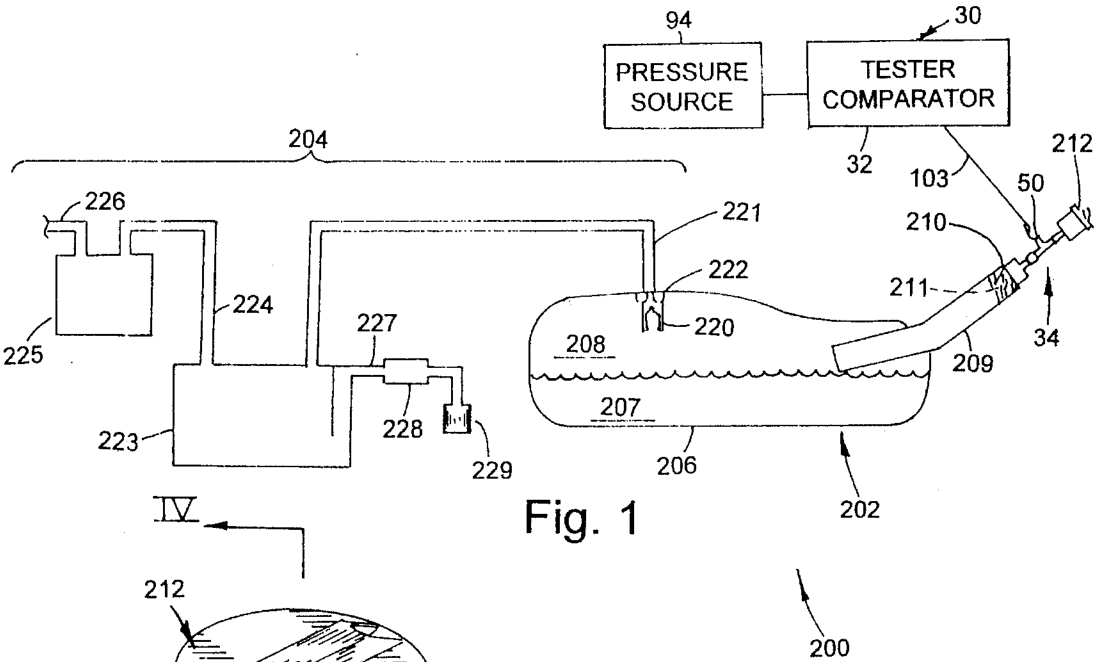
FIG. 1 is a schematic view of an evaporative emissions test apparatus embodying the present invention connected to a vehicle fuel holding system, the fuel holding system including a fuel tank assembly and an evaporative emissions control apparatus, the apparatus including a tester and an adapter connecting the tester to tile vehicle fuel holding system through an existing access port on the fuel tank assembly.

An evaporative emissions test apparatus 30 (FIG. 1) embodying the present invention includes a tester 32 adapted to pressure test a vehicle fuel holding system 200 for vapor emitting leaks, and an adapter 34 configured to releasably engage fuel holding system 200. More specifically, the vehicle fuel holding system 200 includes a fuel tank assembly 202 defining an access port 210 allowing fuel to be added to fuel tank assembly 202, and further includes a fuel cap 212 configured to sealingly engage access port 210 to prevent loss of fuel vapors including hydrocarbons (hereinafter called evaporative emissions) through access port 210. An evaporative emissions control system 204 is connected to fuel tank assembly 202 to control the evaporative emissions, such as by feeding the evaporative emissions to the vehicle engine (not shown) for burning. Adapter 34 (FIG. 1) is configured to sealingly engage tile access port 210 on tile fuel holding system 200 and also is configured to sealingly receive a fuel cap 212 so that the fuel holding system 200 can be quickly and efficiently tested as a complete unit, even on a fully assembled vehicle already in service.

A typical vehicle fuel holding system 200 (FIG. 1) includes a fuel tank assembly 202 and an evaporative emissions control system 204 operably connected to the fuel tank assembly 202. The fuel tank assembly 202 includes a fuel tank 206 shown as having fuel 207 therein, and an atmosphere 208 including fuel vapors containing hydrocarbon vapors considered harmful to the environment. A fuel tank fill tube 209 is sealingly attached to fuel tank 206. Fuel fill tube 209 defines an access port 210 at the side of a vehicle, and is adapted with threads 211 to mateably receive fuel cap 212 (FIG. 13).

Fuel cap 212 includes a threaded protruding end 213 (see FIGS. 3 and 13) having external threads 214 configured to mateably engage fill tube threads 211, and an aesthetic cover 215 mateably joined to threaded protruding end 213. Aesthetic cover 215 is configured to rotatingly slip with a predetermined torque on threaded protruding end 213 so that fuel cap 21.2 cannot be over-tightened. Threaded protruding end 213 includes a seal 216 for sealingly engaging access port 210, and further includes a relief valve 217 configured to release pressure within fuel holding system 200 if the fuel holding system 200 is overpressurized.

The evaporative emissions control system 204 (FIG. 1) includes a valve 220 located at fuel tank 210, and further includes an atmosphere communicating line 221 extending from and operably connected to fuel tank 206 at connection 222. Notably, the valve 220 at tank connection 222 prevents liquid fuel from entering atmosphere containing line 221. The line 221 extends from fuel tank 210 to a carbon canister 223. Another atmosphere communicating line 224 extends from carbon canister 223 to a solenoid 225. Solenoid 225 controls flow of the evaporative emissions to the vehicle engine through line 226. A second line 227 extends from carbon canister 223 through an N/O canister vent shutoff solenoid 228 to a purged air filter 229.

Figure 2:
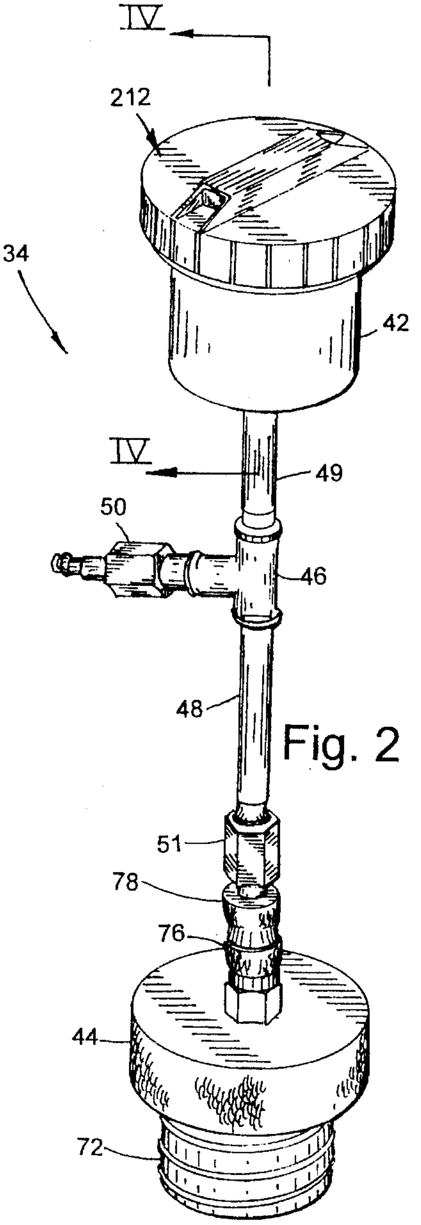
FIG. 2 is an enlarged perspective view of the adapter shown in FIG. 1, including a fuel cap engaged with the adapter.

Adapter 34 (FIG. 1) is particularly configured to permit quick attachment of tester 32 to a vehicle, but without the need for specialized or "extra" parts on the vehicle. Further, adapter 34 advantageously allows testing of the complete fuel holding system 200 of the vehicle including the evaporative emissions control system 204 and the fuel tank assembly 202 (including fuel tank 206, fuel tube 209 and fuel cap 212) in a single test as a complete system. Adapter 34 (FIGS. 2 and 3) includes a body or intermediate member 40 and first and second end members 42 and 44 connected to body 40. More specifically, body 40 includes a T-connector 46 with rigid tube sections 47, 48 and 49 extending from T-connector 46. A quick disconnect 50 is connected to the end of tube section 47 for releasably connecting to tester 32. Another quick disconnect 51 is connected to tube section 48, and it is contemplated that yet another quick disconnect could be connected to tube section 49 if desired, although no such quick disconnect is shown.

Figure 4:
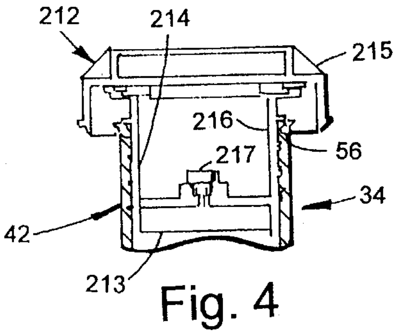
FIG. 4 is a cross-sectional view taken along the IV—IV in FIG. 2.

End member 42 (FIGS. 3–6) is generally cup-shaped and includes an end section 53 and a cylindrically-shaped sidewall 54. Internal threads 55 are located on the inside of sidewall 54, threads 55 defining retention surfaces comparable to the threads on the inside of access port 210 and thus being adapted to mateably receive threads 214 of fuel cap 212. The outer end surface 56 on sidewall 54 is substantially flat and adapted for sealing against seal 216 on fuel cap 212 (FIG. 4). A bore 58 extends through end section 53. Bore 58 is threaded and mateably receives and engages tube section 49.

As shown in FIG. 4, end member 42 is configured to matingly receive fuel cap 212 with fuel cap threads 214 engaging end member threads 211 so that fuel cap seal 216 seals against the end surface 56 on end member 42. The passageway within body 40 places fuel cap relief valve 217 in fluid communication with access port 210, thus allowing the fuel cap 212 to be tested with the vehicle fuel holding system 200 during the evaporative emissions test.

End member 42 (FIGS. 5–6) includes three longitudinally extending slots 59 that cut transversely across threads 55. Slots 59 are located 120° apart around the inside surface of sidewall 54. Slots 59 are constructed to receive mating prongs on a fuel fill cap (not shown) now being developed. The new fuel fill cap would telescope into end member 42 with the prongs sliding along slots 59. Once inserted, the new fuel cap would be rotated about 90° such that the prongs would operably engage the threads 55. Thus, end member 42 is adapted to receive either of two different types of fuel fill caps (212).

It is also contemplated that a quick disconnect could be located on end member 42 for releasably engaging a corresponding quick disconnect on tube section 49. This would facilitate selective replacement of end member 42. Thus, an end member configured to engage a different style fuel fill cap could be quickly and easily attached to tube section 49. Thus, a plurality of different end members (42) could be provided as needed to cover newly designed fuel fill caps.

Figure 9:
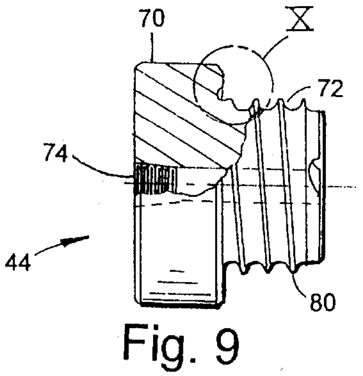
FIG. 9 is a cross-sectional view taken along the plane IX—IX in FIG. 8.
Figure 8:
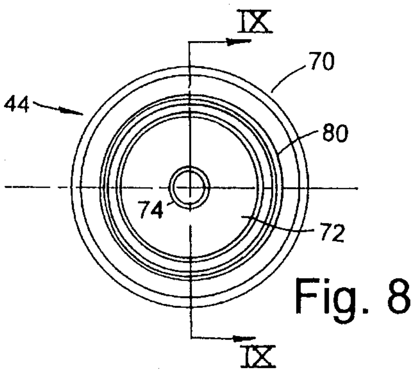
FIG. 8 is an end view of the second end member shown in FIG. 3.

End member 44 (FIGS. 8–10) includes a large diameter end 70 and a small diameter end 72. A bore 74 extends longitudinally through end member 44 for engaging a tube nipple 76 and quick disconnect 78. Quick disconnect 78 engages quick disconnect 51 on adapter body 40. This allows a particular end member 44 to be selected from a plurality of such end members, each of the plurality of end members being configured to fit various car/vehicle access port configurations. For example, one known style access port configuration on older U.S. built vehicles includes a 90° twist and lock configuration as opposed to fuel cap threads 214.

Figure 10:
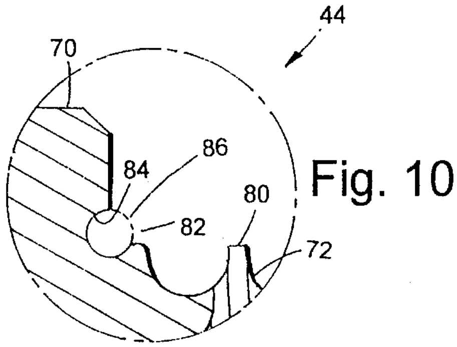
FIG. 10 is an enlarged view of the circled area X in FIG. 9.

Small diameter end 72 includes external threads 80 configured to engage access port 210 in the same manner as fuel;cap 212 engages access port 210. Large diameter end. 70 and small diameter end 72 form an exterior corner 82 (FIG. 10). A ring-shaped recess 84 is located at corner 82 for receiving an O-ring 86 for sealing against the end of access port 210 in a manner like seal 216 of fuel cap 212. The outer diameter of large diameter end 70 is knurled or otherwise treated to improve gripping so that end member 44 can be easily grasped and screwed into access port 210.

Figure 11:
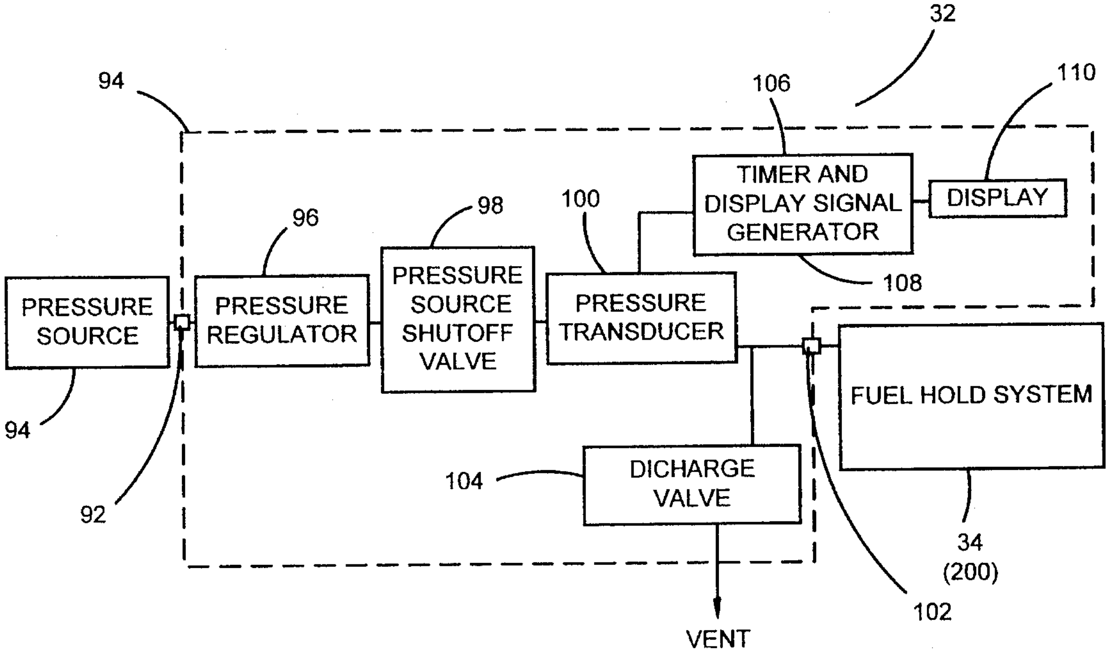
FIG. 11 is a schematic view of the tester shown in FIG. 1.

Tester 32 (FIG. 11) includes a portable housing 90 represented by the dashed lines in FIG. 11. A connector 92 is attached to tester 32 and extends from housing 90 for connecting to an external pressure source 94. It is contemplated that external pressure source 94 can be an air compressor, bottled gas such as argon, or another pressure source. Notably, pressure source 94 could be included within housing 90, such as by including an air compressor within housing 90. A pressure regulator 96 is connected to connector 92 for setting the desired pressure of the system. It is contemplated that the desired pressure will be in the range of 15 to 40 inches of water.

A shutoff valve 98 is connected to pressure regulator 96, shutoff valve 98 allowing controlled addition of pressure through tester 32 and further preventing back-flow of atmosphere from the fuel holding system 200 through tester 32 during operation of the test. Also, a pressure sensor 100 chosen to accurately sense a pressure drop of about 6.0 inches of water or less is operably connected adjacent shutoff valve 98, and a connector 102 is connected to pressure sensor 100 for connecting to the vehicle fuel holding system 200 to be tested. For example, connector 102 can be connected to a flexible hose having a quick disconnect adapted to engage quick disconnect 50 on adapter 34. A discharge valve 104 is connected to the tester 200 such as between pressure sensor 100 and connector 102. A timer 106 and display signal generator 108 are operably connected to pressure sensor 100, and a display 110 is connected to display signal generator 108. Timer 106 is adapted to indicate the passage of a predetermined amount of time such as not less than about two minutes.

Figure 12:
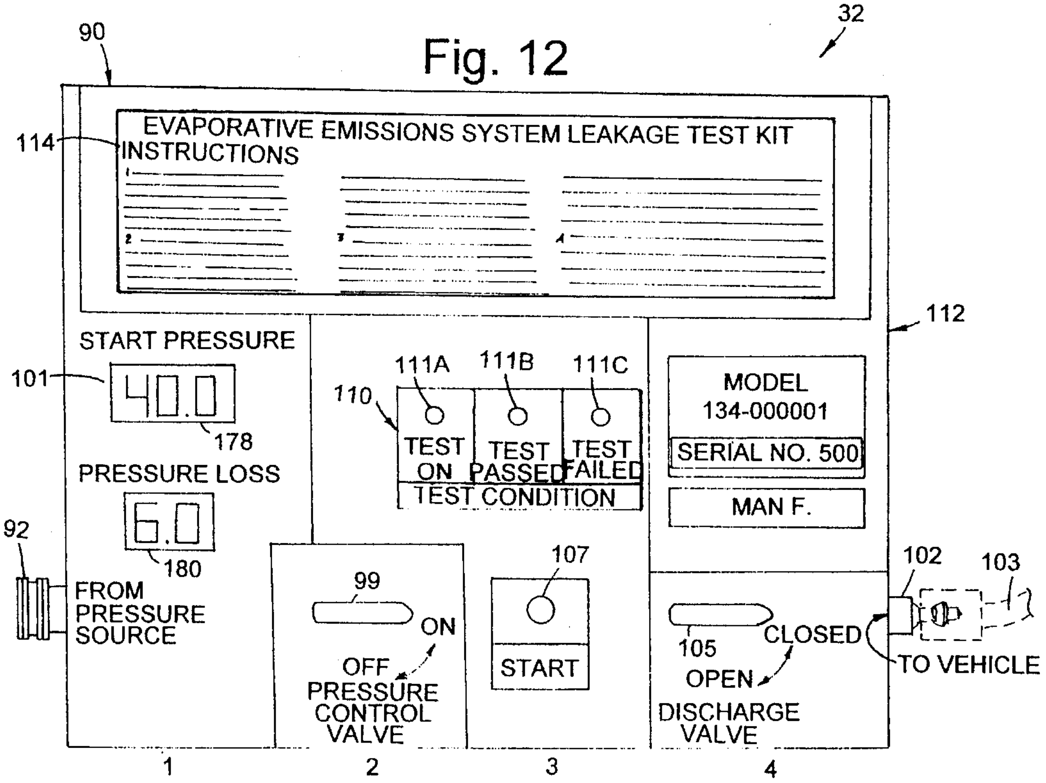
FIG. 12 is a front view of a control panel for the tester shown in FIG. XI.

An exemplary control panel 112 for tester 32 is shown in FIG. 12 and includes a connector 92, and a non-adjustable pressure regulator (96). Further, a knob 99 allows control of the shutoff valve (98), and a second knob 105 allows control of the discharge valve (104). An LCD display 101 is connected to the pressure sensor (100) to provide a readout of the pressure within fuel holding system 200. A start button 107 is operably connected to the timer (106), button 107 including a manually actuatable push-button-type switch for actuating the timer (106). Display 110 is shown as including a "test on" light ILIA, a "test pass" light 111B, and a "test fail" light 111C. Also shown is connector 102 for connecting to a hose 103 connected to adapter connector 50. The control panel 112 further includes instructions 114 giving details about tile operation of tester 32 as may be required. Notably, it is contemplated that housing 90 will include storage areas (not shown) such as for receiving and storing adapter 34 and several of the plurality of end members 42 or 44 as may be required.

Figure 11A:
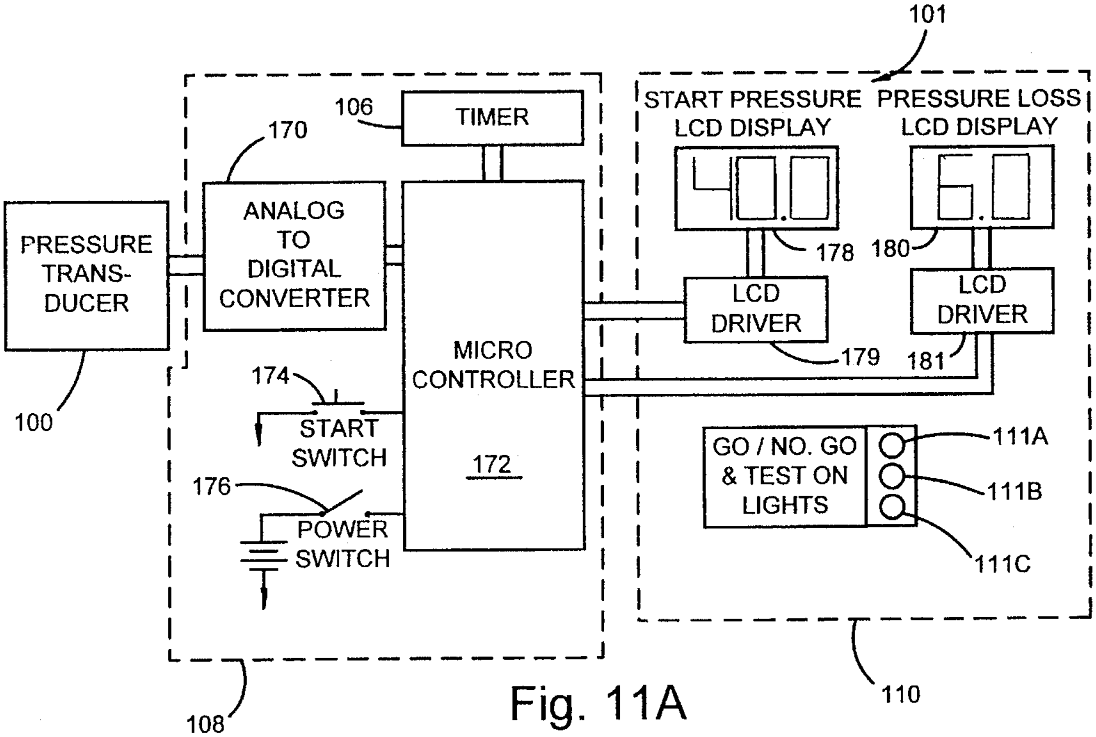
FIG. 11A is a schematic view of the electrical control and display circuit of the tester shown in FIG. 1.

An electrical schematic of tester 32 including pressure transducer 100, timer 106, display signal generator 108, and display 110 is shown in FIG. 11A. Display signal generator 108 includes an analog-to-digital converter 170 for converting analog signals from pressure transducer 100 into digital signals for a microcontroller 172. AD converter 170 is operably connected to pressure transducer 100 for receiving signals indicating the atmospheric pressure in the fuel system, and is further operably connected to microcontroller 172 for outputting a converted digital signal to LCD driver 179 and/or 181. A start switch 174 and power switch 176 are operably connected to microcontroller 172 along with timer 106. Display 110 is also operably connected to microcontroller 172 and includes an LCD display 178 (and display driver 179) for indicating the starting atmospheric pressure, an LCD display 180 (and display driver 181) for indicating the atmospheric pressure loss, and the "test on"/"go"/"no-go" lights 111A, 111B, and 111C.

With power switch 176 on, microcontroller 172 is energized and signals are received from pressure transducer 100 through AD converter 170. Microcontroller 172, in response to the signal from the pressure transducer signal, sends a corresponding signal to display driver 179 causing pressure readings to be displayed on LCD display 178. When start switch 174 is closed, timer 106 is actuated and signals are transmitted from microcontroller 172 to display driver 181 causing pressure loss readings to be displayed on LCD display 180. As timer 106 completes its timing function and indicates completion of a predetermined time period, the pressure loss reading on display 180 is frozen. Also, the appropriate "go"/"no-go" display light 111B or 111C, respectively, is lighted. Notably, the present invention is contemplated to include a number of different electrical arrangements and configurations, and the above disclosed circuitry is not intended to be unnecessarily limiting to the scope of the inventive concepts claimed herein.

Test apparatus 30 is operated in the following manner. The fuel holding system 200 is prepared as required, such as: by reducing the amount of fuel held within fuel holding system 200, and tester 32 is prepared as required, such as by setting pressure regulator 96 to the appropriate desired determined pressure. Pressure source 94 is then connected to tester 32 and tester 32 is connected to the fuel holding system 200 such as by use of adapter 34 as previously described. As shutoff valve 98 is opened, pressure source 94 communicates a volume of air or gas through tester 32 into the fuel holding system 200. This pressurizes the atmosphere within fuel holding system 200 to the predetermined pressure. Once the predetermined pressure is stably established, shutoff valve 98 is closed and timer 106 is actuated. Notably, tester 32 can be configured so that timer 106 is automatically actuated as shutoff valve 98 is closed, or it can be configured so that timer 106 must be manually tripped. After expiration of a predetermined amount of time, timer 106 actuates display signal generator 108 which initially determines through use of pressure sensor 100 whether the continuing pressure of the atmosphere within fuel holding system 200 is at or above an acceptable second predetermined pressure. Notably, the second predetermined pressure can be a preset value, a value stored in memory or a value set by adjustment based on the particular vehicle fuel holding system being tested. Display signal generator then displays a signal through display 110 showing whether the fuel holding system 200 has passed the test. Notably, tester 32 operates automatically to display a pass/fail signal as timer 106 expires. This causes display signal generator 108 to automatically display the test result on display 110. It is contemplated that this will reduce or eliminate the tendency to inaccurately read the results of the test.

Presuming for a moment that the fuel holding system 200 has failed the test, the system 200 can be left in a pressurized state so that a fuel vapor leak detector (not shown) can be used to determine where the leak(s) causing the failure is located. Once the test is complete and the pressure within vehicle fuel holding system 200 is no longer needed, discharge valve 104 is placed in tile open position to relieve the pressure after the pressure source shutoff valve is placed in tile off position.

It is contemplated that tester 32 can be connected to other places on vehicle fuel holding system 200 other than only through the access port 210. As shown in FIG. 13, connector 102 of tester 32 is connected to a special test port 120 located substantially anywhere on the evaporative emissions control system 204 of fuel holding system 200. Further, it is noted that tester 32 could be connected to evaporative emissions control system 204 such as by disconnecting one of lines 221,224, 226, 227 and 209, connecting to the disconnected line, and plugging any open connections resulting from the disconnection.

It is also contemplated that modifications of adapter 34 can be made. In another embodiment shown in FIGS. 14 and 15, an adapter 130 includes an elongated tubular first member 132 and an elongated tubular second member 134 mateably telescopingly received in first member 132. Elongated first member 132 includes a bore 136 for slideably receiving second elongated member 134, and further includes internal threads 138 at an outer end for mateably engaging external threads 140 on second elongated member 134. A tip 142 on the access-port-engaging end of second elongated member 134 extends beyond a tip 144 on the end of first elongated member 132. Tip 142 includes a compression washer 146 proximate its end which is held on tip 142 by a snap-lock ring or similar means. A resilient deformable but substantially incompressible grommet 150 made of rubber or elastomeric material is positioned between compression washer 146 and the end of tip 144. Tip 142, tip 144, washer 146, and grommet 150 are insertable into access port 210 as discussed below. A handle 158 is located on second elongated member 134 opposite tip 142. A bore 147 extends longitudinally through tubular second member 134.

An enlarged view of the end of adapter 130 is shown in FIG. 14 as being positioned in an exemplary fuel tank access port 210. Access port 210 is cup-shaped and includes a wall forming member 152 having a hole 154 therein, and an internally threaded side wall 153. As is well known in the art, hole 154 has a standardized size for receiving a gasoline/fuel dispensing nozzle of particular size. For example, gasoline dispenser nozzles for dispensing leaded gasoline will not fit into nozzles for dispensing unleaded gasoline. Sidewall 153 includes a threaded section 155 and a cylindrically-shaped section 156. Tip 142 is shaped so that it can be extended into access port 210 with grommet 150 extending to a position adjacent cylindrically-shaped section 156. As second elongated member 134 is rotated by handle 158, it forces second elongated member 134 in a longitudinal direction on first elongated member 132. This causes grommet 150 to be compressed between compression washer 146 on second member 134 and the end of tip 144 on first elongated member 132. As shown in FIG. 15, this compression results in grommet 150 bulging and sealingly engaging the material forming cylindrically-shaped section 156. Thus, a seal is formed. Notably, handle 158 includes a bore 162 that connects to bore 147, and further includes a connector 164 extended into bore 162. Connector 164 can be connected to tester 32 and thus the pressure-testing of fuel holding system 200 can be conducted in a generally similar manner to that previously described.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An emissions test apparatus for vapor emitting leaks in a fuel holding system in a vehicle, said fuel holding system including a vehicle fuel tank and a fuel vapor control system operably connected to said fuel tank, said fuel tank and said fuel vapor control system defining an atmosphere, comprising:

an atmosphere pressure changing device operably connected to said fuel holding system for changing the pressure of said fuel holding system atmosphere to a predetermined pressure;

a pressure sensor operably connected to said fuel holding system for sensing the pressure of said atmosphere in said fuel holding system over time;

a timer for indicating passage of a predetermined amount of time;

a switch for actuating said timer when said predetermined pressure is reached;

an indicator operably connected to said timer and said pressure sensor for indicating whether any change in the pressure of said atmosphere over said predetermined time is acceptable;

said fuel tank including an access port for filling said fuel tank, and said atmosphere pressure changing device including an adapter configured to sealingly engage said access port;

said fuel holding system including a fuel cap adapted to sealingly engage and cover said access port, and said adapter including a first end configured to sealingly engage said access port and further including a second end configured to sealingly receivingly engage said fuel cap, said adapter placing said fuel cap and said access port in fluid communication when engaged with said adapter, whereby said fuel holding system can be tested as a complete unit for vapor leaks; and said fuel cap including a pressure relief valve for venting said fuel holding system upon over-pressurization and a seal for sealingly engaging said access port, said adapter including a passageway operably connecting said fuel cap to said fuel tank when the fuel cap is connected to the adapter and further including a surface for sealingly engaging said fuel cap seal.

2. An emissions test apparatus as defined in claim 1 wherein said adapter includes an intermediate member operably connecting said first and second ends, said intermediate member including a connector operably connecting to said atmosphere pressure changing device.

3. An emissions test apparatus as defined in claim 2 wherein said intermediate member includes a quick disconnect coupling for releasably connecting to said atmosphere pressure changing device.

4. An emissions test apparatus as defined in claim 2 wherein said intermediate member includes a quick disconnect, and one of said first end and said second end are releasably connected to said quick disconnect.

5. An adapter facilitating emissions testing of a fuel holding system of a vehicle, the fuel holding system including a fuel tank assembly having a fill tube defining an access port and a fuel cap for sealingly covering said access port, comprising:

a first end member configured to sealingly engage said access port, said first end member defining a first passageway in fluid communication with said fuel tank assembly when said first end member is engaged with said access port;

a connector operably connected to said first end member and in fluid communication with said first passageway, said connector being configured to connect to an emissions test apparatus; and a second end member operably connected to said first end member and to said connector, said second end member being configured to sealingly receivingly engage said fuel cap, said second end member including a second passageway in fluid communication with said first passageway so that said fuel cap is in fluid communication with said access port when said fuel cap is engaged with said second end member, whereby said fuel holding system including said fuel cap can be tested as a complete unit by said emissions test apparatus for vapor emitting leaks.

6. An adapter as defined in claim 5 wherein said fuel tank cap includes a pressure relief valve for venting said fuel holding system upon over-pressurization and a seal for sealingly engaging said fill tube to close said access port, and wherein said second end member includes a surface for sealingly engaging said fuel cap seal such that said pressure relief valve of said fuel cap can be tested with said fuel holding system.

7. An adapter as defined in claim 5 wherein said adapter includes an intermediate tubular member operably connecting said first and second end members to said connector.

8. An adapter as defined in claim 7 wherein said intermediate member includes a quick disconnect coupling for releasably connecting to said emissions test apparatus.

9. An adapter as defined in claim 7 wherein said intermediate member includes a quick disconnect, and one of said first and second members are releasably connected to said quick disconnect.

10. An adapter as defined in claim 9 including a plurality of said one end member, whereby a particular of said one end member can be selected for a given test.

11. An adapter for simultaneously engaging an access port to a vehicle fuel holding system and receiving a fuel cap configured to sealingly engage and cover said access port, comprising:

a conduit having a first end and a second end and defining a first passageway extending between said first and second ends, said first end being configured to mateably sealingly engage said access port, said second end being configured to mateably sealingly engage said fuel cap, said first passageway being configured to place said access port and said fuel cap in fluid communication when said first end and said second end are engaged with said access port and said fuel cap, respectively; and a connector operably connected to said conduit including a second passageway in fluid communication with said first passageway.

12. An adapter as defined in claim 11 wherein said first end is configured to engage said access port in a manner identical to the manner in which said fuel cap engages said access port, and wherein said second end is configured to engage said fuel cap in a manner identical to the manner in which said access port engages said fuel cap.

13. A method for testing for leaks in a vehicle fuel holding system, the fuel holding system including a fuel tank and an evaporative emissions control system connected to the fuel tank, the fuel tank including an access port and a fuel cap for sealingly covering the access port, comprising:

providing a portable tester for determining pressure loss over time;

providing an adapter configured to sealingly engage the access port and to place the fuel tank in fluid communication with said tester;

providing a cup-shaped member configured to sealingly engage the fuel cap and to place the fuel cap in fluid communication with said tester;

connecting said adapter and said cup-shaped member to said tester and operatively engaging at least one of said adapter and said cup-shaped member with the access port and the fuel cap, respectively;

applying pressure to said at least one of said adapter and said cup-shaped member; and sensing the pressure change over time to determine if an unacceptably large vapor emitting leak is present in at least one of the fuel holding system and the fuel cap.

14. A method as defined in claim 13 wherein said step of applying includes applying pressure to both said adapter and said cup-shaped member.

* * * * *